United States Patent [19]

Park

[11] Patent Number: 5,299,076
[45] Date of Patent: Mar. 29, 1994

[54] BRAKE ACTUATING DEVICE FOR TAPE RECORDER

[75] Inventor: Il M. Park, Seoul, Rep. of Korea

[73] Assignee: Goldstar Co., Ltd., Seoul, Rep. of Korea

[21] Appl. No.: 803,218

[22] Filed: Dec. 6, 1991

[30] Foreign Application Priority Data

Dec. 6, 1990 [KR] Rep. of Korea ............... 20045/1990

[51] Int. Cl.$^5$ ............... G11B 15/18; G11B 15/22; G11B 15/66
[52] U.S. Cl. ............... 360/85; 360/95; 360/96.3
[58] Field of Search ............... 360/85, 95, 74.3, 96.3; 242/197, 199, 201

[56] References Cited

U.S. PATENT DOCUMENTS

| | | | |
|---|---|---|---|
| 4,635,146 | 1/1987 | Koda et al. | 360/85 |
| 4,685,008 | 8/1987 | Ohyama | 360/85 |
| 4,796,116 | 1/1989 | Kwon et al. | 360/85 |
| 4,907,110 | 3/1990 | Ando | 360/85 |
| 5,086,359 | 2/1992 | Tsuchiya | 360/85 X |
| 5,159,506 | 10/1992 | Eino et al. | 360/85 |

*Primary Examiner*—John H. Wolff
*Assistant Examiner*—Craig A. Renner
*Attorney, Agent, or Firm*—Birch, Stewart, Kolasch & Birch

[57] ABSTRACT

A brake actuating device for use in a tape recorder such as a video cassette tape recorder and a digital audio tape recorder includes a supply brake resiliently biased by an elastic member, a brake actuating mechanism for actuating the supply brake, a reel driving mechanism for driving a supply reel and a take-up reel, selectively, a take-up reel rotation-restricting member for preventing the rotation of take-up reel in a tape unloading operation, and a restricting member for restricting the reel driving mechanism not to drive the take-up operation, thereby making it possible to prevent the tape from being excessively unwound and thus being damaged, by loading and unloading the tape with a proper tensional force.

5 Claims, 3 Drawing Sheets

BRAKE ACTUATING DEVICE FOR TAPE RECORDER

BACKGROUND OF THE INVENTION

1. Field of the Invention

The present invention relates to a brake actuating device for use in a tape recorder such as a video cassette tape recorder, a digital audio tape recorder and the like, which perform recording and reproducing functions by use of a magnetic recording tape and more particularly, to a brake actuating device for allowing a tape loading operation to be performed in a state that a proper tensional force is applied to a tape by rotating a supply reel while applying a proper braking force to the supply reel and restraining the rotation of a take-up reel during a tape loading operation.

2. Description of the Prior Art

A conventional brake actuating device for use in a tape recorder is illustrated in FIG. 1. A cam 63 is rotatably mounted at the rear side of a supply reel 61 and a take-up reel 62 and between the supply reel 61 and the take-up reel 62, a pair of main brakes 64 and 65 are pivotably mounted which are actuated by a first lever 66. And, a center gear 67 is rotatably mounted in front of the main brakes 64 and 65, which is engaged with a first gear 69 having an operational member 68. A second lever 70 is pivotally mounted which is interlocked with the operational member 68 of the first gear 69 and a first soft brake 71 is pivotally mounted which is interlocked at its one end with the second lever 70 and is adapted to apply a braking force to the supply reel 61 depending upon the pivotal operation of the second lever 70. In addition, a second gear 72 is provided to be engaged with the cam 63 and a second soft brake 73 is provided which is adapted to apply a braking force to the supply reel 61 in response to a rotational torque of the second gear 72. Also, a cam lever 74 is pivotally mounted which is interlocked at its one end with the cam 63 and at its other end with a third lever 75 which is adapted to actuate the second lever 70.

In such a conventional brake actuating device, when a tape is loaded, the main brakes 64 and 65 are pushed by the first lever 66, which is actuated by a separate power source(not shown), so as to be separated from the supply reel 62 and the take-up reel 63, respectively, and the cam 63 rotates clockwise, thus rotating the second gear 72 counterclockwise. As a result, the second soft brake 73 is rotated clockwise by the rotational torque of the second gear 72, thereby being separated from the supply reel 61. Meanwhile, the center gear 67 is rotated counterclockwise by a separate power source to rotate the first gear 69, and by the rotational torque of the first gear 69, the second lever 70 is rotated clockwise to rotate the first soft brake 71 so that the first soft brake 71 applies a braking force to the supply reel 61. That is, since the supply reel 61 is locked so as not to be rotated while the braking force is released from the take-up reel 62, in the course of loading a tape, the take-up reel 62 can be rotated freely by the releasing force of tape.

On the other hand, under the tape unloading operation, the center gear 67 is rotated in clockwise and the first gear 69 is rotated in counterclockwise so that the second lever 70 is rotated in counterclockwise by the rotational torque of the first gear 69. As a result, the first soft brake 71 is separated from the supply reel 61. At this moment, since the cam 63 rotates in counterclockwise, the second gear 72 is rotated in clockwise so that the second soft brake 73 applies a braking force to the supply reel 61, thereby the supply reel 61 is in a locked-state.

Accordingly, such a conventional brake actuating device requires two soft brakes 71 and 73 to apply a braking force to the supply reel 61. That is, in the interval of releasing the second soft brake 73, the supply reel 61 is braked by the first soft brake 71 while in the interval of releasing the first soft brake 71, the supply reel 61 is braked by the second soft brake 73.

However, such a conventional device has disadvantages in that since the number of required brakes is large and a number of levers are required for actuating the brakes at predetermined times, the whole mechanism is complicated and the cost becomes high.

SUMMARY OF THE INVENTION

It is, therefore, an object of the present invention to provide a brake actuating device for a tape recorder which is simple in construction by making it possible to obtain a predetermined tension required in a tape in the tape loading or unloading operation with a single brake for applying a braking force to the supply reel.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a brake actuating device for use in a tape recorder which includes a cam lever having a pin engaging with a cam groove of a cam, a slide plate for actuating a brake to be engaged with or separated from a supply reel by being rectilinearly reciprocated, a take-up reel rotation-restraining member, formed at an end of an idler arm, for preventing the take-up reel from being freely rotated during the tape unloading operation, and a restricting arm for preventing the take-up reel from being rotated any further upon completion of the tape unloading operation.

According to the present invention, the tape loading operation is carried out in a state that a proper braking force is applied to the supply reel, and the take-up reel is not rotated by an interlocking operation of the cam lever and the slide plate and an interlocking operation of the take-up reel rotation-restraining member and the restricting member, while the tape unloading operation is carried out in a state that the rotation of take-up reel is restricted and the supply reel is rotated under the state that a predetermined tension is applied to a tape, thereby obtaining a tape tension required in the tape loading and unloading operations with a single brake.

BRIEF DESCRIPTION OF THE DRAWINGS

The present invention will become more fully understood from the detailed description given hereinbelow and the accompanying drawings which are given by way of illustration only, and thus are not limitative of the present invention, wherein:

FIG. 2 through FIG. 4 are plane views illustrating the configuration and operation of the brake actuating device of the present invention, in which;

FIG. 2 is a plane view showing a stop state of the brake actuating device;

FIG. 3 is plane view showing an initial state of an unloading operation of the brake actuating device; and FIG. 4 is a plane view showing a play state of the brake actuating device.

DESCRIPTION OF THE PREFERRED EMBODIMENTS

Figure 1:
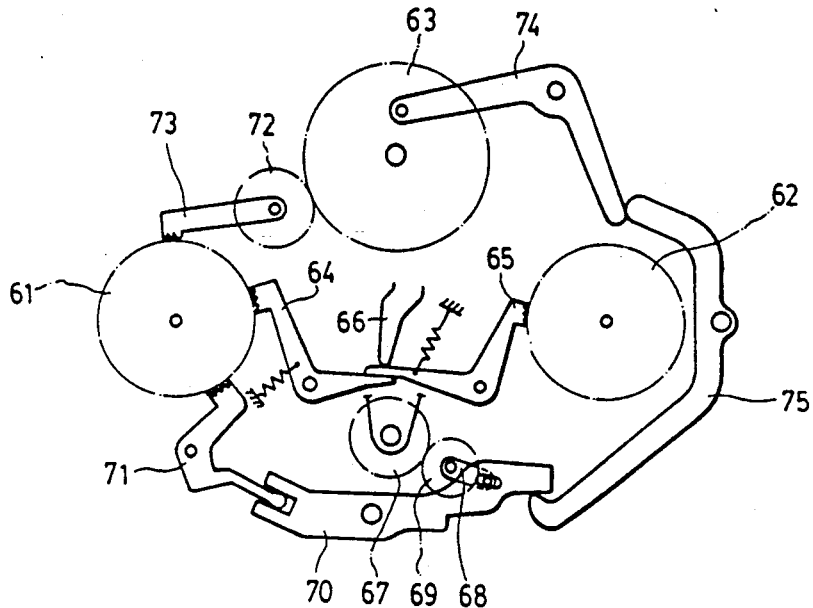
FIG. 1 is a plane view showing a conventional brake actuating device.

Referring now in detail to the drawings for the purpose of illustrating preferred embodiments of the present invention, the brake actuating device for use in a tape recorder as shown in FIGS. 2 to 5, which comprises a brake 10, pivotably mounted adjacent to a supply reel 1 and provided with a braking member 11, for applying a braking force to the supply reel 1, an elastic member 13 for biasing the brake 10 so that the braking member 11 of the brake 10 closely contacts a band brake 5 wound on the supply reel 1, a brake actuating member 20 for actuating the brake 10 so that the brake 10 applies a braking force to the supply reel 1 by a resilient force of the elastic member 13 until just before a tape loading completion state from a stop state and the brake 10 is separated from the supply reel 1 in a play mode, a reel driving member 30 for selectively driving the supply reel 1 and the take-up reel 2, a brake(not shown) for applying a braking force to the take-up reel 2 untill completion of tape loading from the stop mode and releasing a braking force from the take-up reel 2 in the play mode, a take-up reel rotation-restraining member 40 for restraining the rotation of the take-up reel 2 in the tape unloading mode, and a restricting member 50 for preventing the take-up reel 2 from being rotated by the reel driving member 30 when the tape unloading is completed.

The brake 10 is pivotably mounted in front of the supply reel 1 by means of a shaft 10' and provided at one end thereof with a braking member 11 and at the other end thereof with a pin 12. Also, the brake 10 is resiliently biased by means of an elastic member 13 such as a tensional coil spring in a counterclockwise direction in the drawing.

Figure 5:
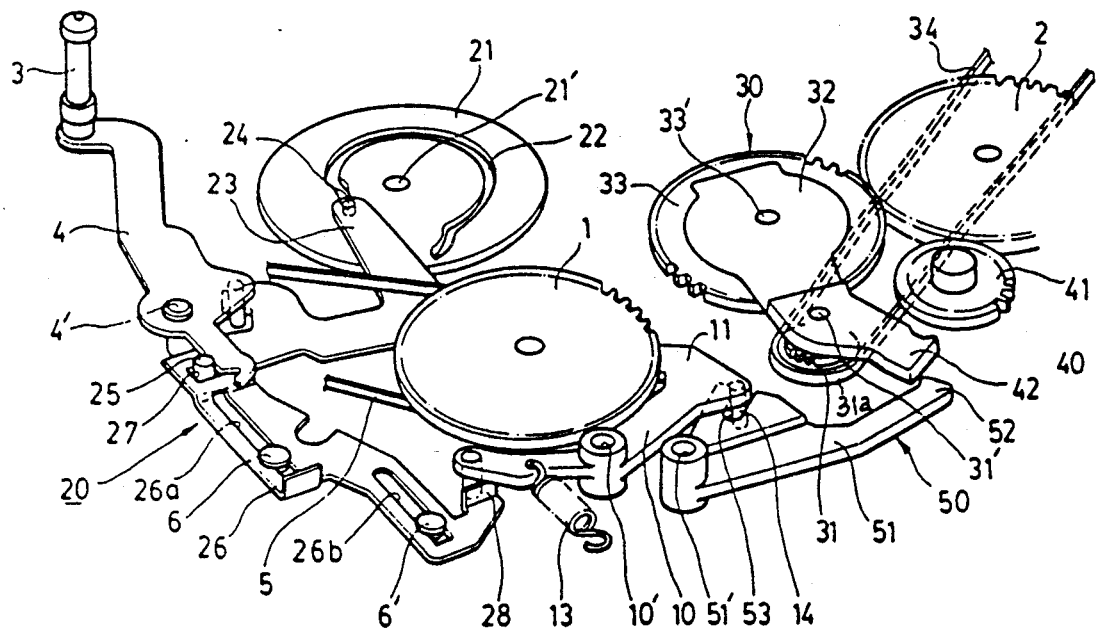
FIG. 5 is a perspective view of essential elements of the brake actuating device of the present invention.

As can clearly be seen in FIG. 5, the brake actuating member 20 comprises a cam 21, a cam lever 23 interlocked with the cam 21, and a slide plate 26 for actuating the brake 10 by being interlocked with the cam lever 23.

The cam 21 is rotatably mounted at the rear of the supply reel 1 by means of an axial pin 21' and provided on the upper surface thereof with a cam groove 22.

The cam lever 23 is pivotably mounted by means of an axial pin 23' and provided at one end thereof with a pin 24 to be inserted in the cam groove 22 and at the other end thereof with a connecting pin 25.

The slide plate 26 is provided with a pair of guide grooves 26a and 26b in which a pair of guide pins 6 and 6' fixed on the base plate are inserted so as to be rectilinearly moved. The slide plate 26 is also provided at its one end with a hole 27 in which a connecting pin 26 of the cam lever 23 is inserted and at its other end with a flap 28 to be pushed by a pin 12 provided at the end of the brake 10.

The reel driving unit 30 comprises an input gear 31 pivotably mounted between the supply reel 1 and the take-up reel 2 by means of a shaft 31', an idler lever 32 pivotably mounted on the shaft 31', a center idler gear 33 rotatably mounted on the idler lever 32 by means of a shaft 33' which is meshed with the input gear 31, and a pulley 31a provided at a lower part of the input gear 31 and connected to a capstan wheel (not shown) by means of a belt 34 so as to receive a driving force from a capstan motor(not shown). By these arrangements, the center idler gear 32 is meshed, selectively, with the supply reel 1 or the take-up reel 2 so as to transmit the driving force thereto in accordance with the rotational direction of the input gear 31.

The take-up reel rotation-restraining unit 40 comprises a one-way gear 41 meshed with the take-up reel 2 and a ratchet 42 formed at one end of the idler lever 32 for preventing the rotation of the one-way gear 41.

The restricting unit 50 comprises a restricting arm 51 pivotably mounted in front of the supply reel 1 by means of a shaft 51'. The restricting arm 51 is provided with a connecting recess 53 to be engaged with the connecting pin 14 of the brake 10 and a protrusion 52 for restricting the ratchet 42.

The cam 21 may be driven by the capstan motor or other motors.

In the drawings, reference numeral 4 is a tension lever which is provided at its rear end with a tension pin 3 and is connected at its mid-portion to a band brake 5, the other end of which is fixed to the base plate.

Figure 2:
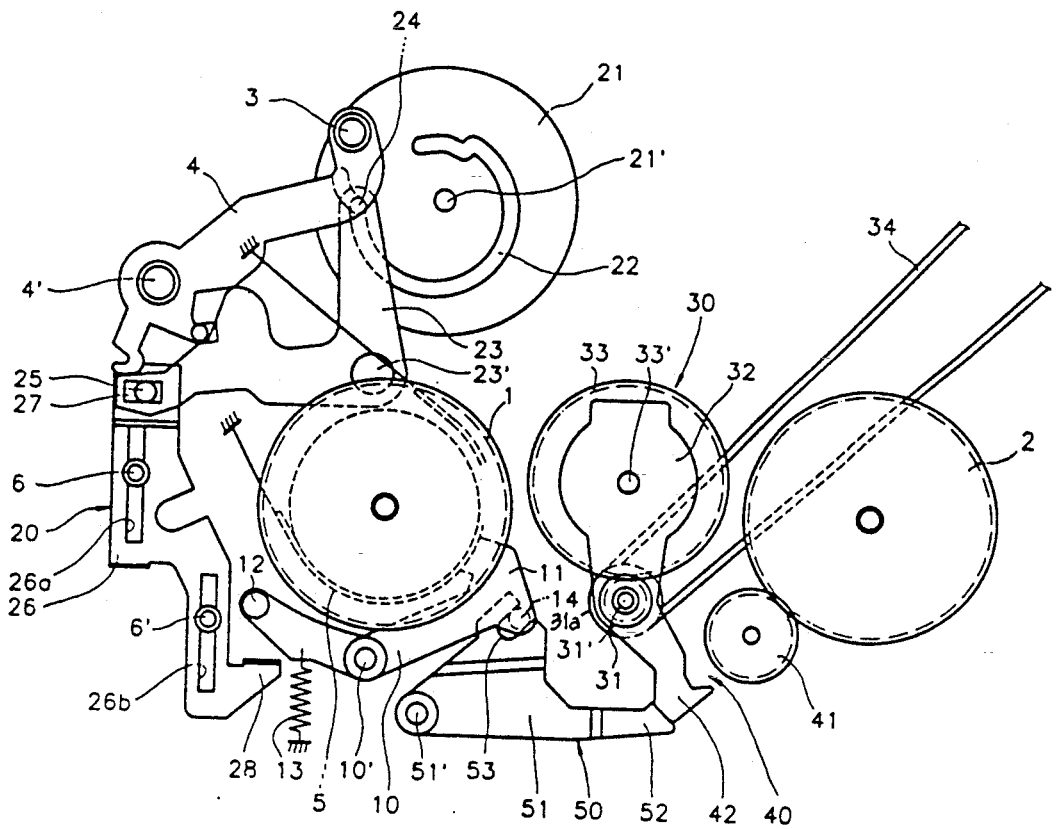

The brake actuating device of the present invention operates as follows:

When a tape loading operation is carried out in a stop state as shown in FIG. 2, tape is drawn out of a tape cassette by a separate tape loading device(not shown) so that the supply reel 1 is freely rotated by the drawing-out force of tape. At this moment, since the take-up reel 2 is locked by a separate braking mechanism(not shown), it cannot be rotated, while the tape is released only from the supply reel 1. When the cam 21 rotates clockwise so that the tape loading mechanism can advance toward a head drum(not shown), the cam lever 23 rotates clockwise since the pin 24 of the cam lever 23 is inserted into the cam groove 22 of the cam 21. Accordingly, the connecting pin 25 of the cam lever 23 pulls the slide plate 26 backwardly so that the flap member 28 of the slide plate 26 approaches the connecting pin 12 of the brake 10. At this time, since the braking member 11 of the brake 10 presses the band brake 5 which is wound around the supply reel 1 by means of the resilient force of the spring 13, the supply reel 1 rotates clockwise in a state of receiving a braking force. This is because the tape is excessively unwound from the supply reel 1 thus and may be damaged when the supply reel 1 is freely rotated during a tape loading operation.

Figure 4:
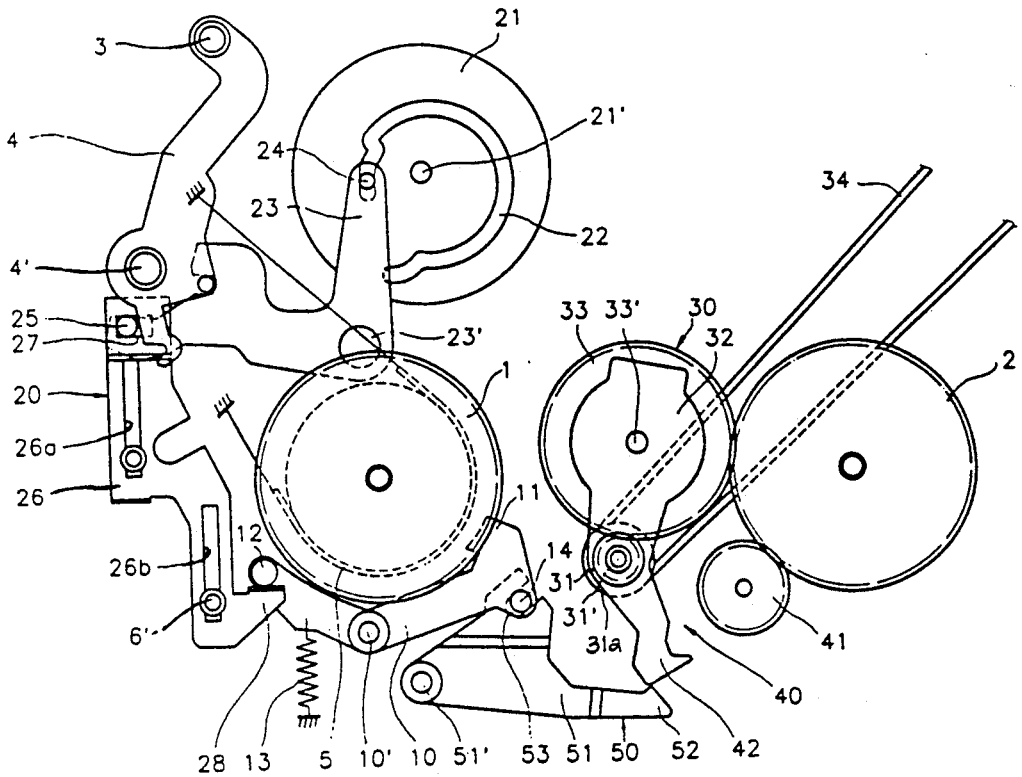

When the tape loading operation is completed, the cam lever 23 rotates furthermore clockwise by the curvature of the cam groove 22 to move the slide plate 26 farther backward so that the braking member 11 of the brake 10 is separated from the band brake 5, as shown in FIG. 4, thereby making it possible to carry out a play mode.

Figure 3:
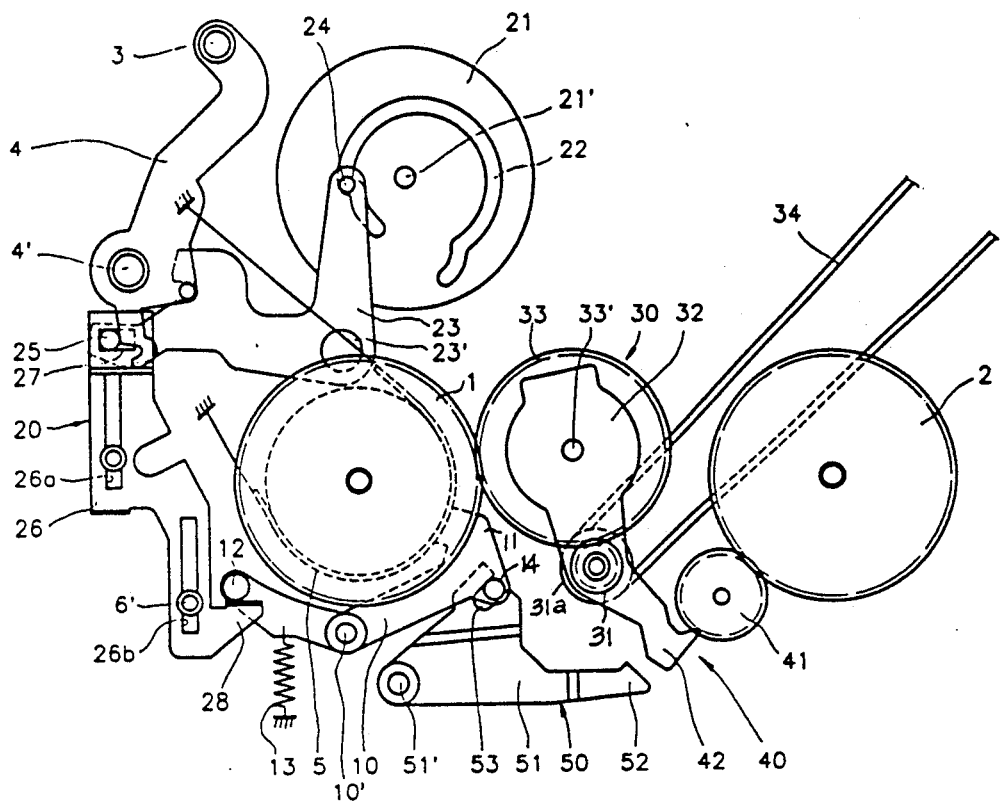

In case that the play mode is carried out in a state as shown in FIG. 3, the supply reel 1 receives only a braking force of the band brake 5 so that a proper tape tension can be maintained and a take-up brake is also separated from the take-up reel 2 so that the take-up reel 2 may be freely rotated.

On the other hand, when an unloading mode is carried out, the center idler gear 33 rotates the supply reel 1 counterclockwise while the rotation of one-way gear 41 and the take-up reel 2 is restricted by the ratchet 42 of the idler lever 31, and also the tape loading mechanism is retreated to its original position so that the supply reel 1 winds in the tape which has been wound around the head drum.

When the unloading operation is completed, the capstan motor must be rotated clockwise few a degree in order to separate the center idler gear 33 from the supply reel 1. At this moment, if the rotation of the capstan motor a few degrees in a short time has failed, the center idler gear 33 is engaged with the take-up reel 2 in place of being separated from the supply reel 1. Accordingly, an additional capstan servo system is required to obtain a minute rotation of the capstan motor. However, in the present invention the center idler gear 33 is prevented from being meshed with the take-up reel 2 upon completion of unloading by means of a simple structure using a restricting arm 51.

That is, since the slide plate 26 moves backwardly and the brake 10 rotates clockwise in the play mode, as shown in FIG. 4, the restricting arm 51 is rotated clockwise so that the idler lever 32 may be rotated without any restriction of the restricting arm 51. While in the stop mode as shown in FIG. 2, the slide plate 26 is moved in the forward and the brake 10 is rotated counterclockwise by means of the spring 13 and also the restricting arm 51 is rotated clockwise, so that the restricting arm 51 prevents the idler lever 32 from being rotated clockwise. Accordingly, even though the capstan motor is rotated clockwise without any precise control upon completion of unloading operation, the protrusion 52 of the restricting arm 51 restricts in advance the ratchet 42 of the idler lever 32 so that the center idler gear 33 is positioned between the supply reel 1 and the take-up reel 2, thereby preventing the center idler gear 33 from being engaged with the take-up reel 2.

As described above in detail, the present invention provides the effect that it is possible to prevent the tape from being excessively unwound and thus being damaged by executing the tape loading and unloading operation in a state that the tape is loaded and unloaded with a proper tensional force.

The invention being thus described, it will be obvious that the same may be varied in many ways. Such variations are not to be regarded as a departure from the spirit and scope of the invention, and all such modifications, as would be obvious to one skilled in the art are intended to be included in the scope of the following claims.

What is claimed is:

1. A brake actuating device for a tape recorder, comprising:
   a supply brake for applying a braking force to a supply reel;
   a cam rotatably mounted adjacent to said supply brake;
   a cam lever interlocked with said cam;
   a slide plate, interlocked with said cam lever and rectilinearly reciprocated, for actuating the supply brake;
   reel driving means, rotatably mounted between the supply reel and a take-up reel, for driving the supply reel and the take-up reel, selectively, said reel driving means comprising an input gear, an idler lever pivotably mounted on a shaft upon which said input gear is rotatably mounted, and a center idler gear rotatably mounted on said idler lever so as to be meshed with the input gear;
   take-up reel rotation-restraining means for preventing the take-up reel from being interlocked with said reel driving means, said take-up reel rotation-restraining means comprising a one-way gear meshed with a geared portion of the take-up reel, and a ratchet, provided at an end of the idler lever, for restraining the rotation of the one-way gear; and
   restricting means for causing the reel driving means not to drive the take-up reel at the time of completion of tape unloading by being interlocked with the take-up reel rotation-restraining means.

2. The device as claimed in claim 1, wherein said supply brake is provided with a braking member at its one end and biased pivotably by means of an elastic member.

3. The device as claimed in claim 1, wherein said cam is provided at its upper surface with a cam groove and said cam lever is provided at its one end with a pin inserted into said cam groove and at its other end with a connecting pin.

4. The device as claimed in claim 3, said slide plate includes a hole in which said connecting pin of the cam lever is inserted, a plurality of guide holes in which guide pins fixed on a base plate are inserted for enabling the slide plate to be rectilinearly reciprocated by being interlocked with the cam lever, and a flap member for pivoting the supply brake.

5. The device as claimed in claim 1, wherein said restricting means includes a restricting arm which is pivotably mounted in front of the supply reel and provided at its one end with a connecting hole engaged with a pin fixed on the supply brake and at its other end with a protrusion for restricting the ratchet of the idler lever.

* * * * *